US005913284A

United States Patent [19]
Van Curen et al.

[11] Patent Number: 5,913,284
[45] Date of Patent: Jun. 22, 1999

[54] STIMULATION DEVICE AND TECHNIQUE

[75] Inventors: Greg Van Curen; Michael D. Westrick, both of Fort Wayne, Ind.

[73] Assignee: Innotek, Inc., Garrett, Ind.

[21] Appl. No.: 08/607,799

[22] Filed: Feb. 27, 1996

[51] Int. Cl.$^{6}$ ........................... A01K 15/02; A01K 15/00

[52] U.S. Cl. ........................................... 119/720; 119/718

[58] Field of Search ............................ 119/718, 719–720, 119/721, 822, 859, DIG. 908

[56] References Cited

U.S. PATENT DOCUMENTS

| | | |
|---|---|---|
| 2,800,104 | 7/1957 | Cameron et al. . |
| 3,098,212 | 7/1963 | Creamer, Jr. . |
| 3,589,337 | 6/1971 | Doss . |
| 4,202,293 | 5/1980 | Gonda et al. . |
| 4,335,682 | 6/1982 | Gonda et al. . |
| 4,440,160 | 4/1984 | Fischell et al. . |
| 4,524,773 | 6/1985 | Fischell et al. . |
| 4,688,574 | 8/1987 | Dufresne et al. . |
| 4,690,144 | 9/1987 | Rise et al. . |
| 4,690,145 | 9/1987 | King-Smith et al. . |
| 4,699,143 | 10/1987 | Dufresne et al. . |
| 4,745,882 | 5/1988 | Yarnall, Sr. et al. . |
| 4,802,482 | 2/1989 | Gonda et al. . |
| 4,898,120 | 2/1990 | Brose . |
| 4,947,795 | 8/1990 | Farkas . |
| 5,054,428 | 10/1991 | Farkas . |
| 5,067,441 | 11/1991 | Weinstein . |
| 5,207,179 | 5/1993 | Arthur et al. . |
| 5,304,211 | 4/1994 | Israel et al. . |
| 5,307,763 | 5/1994 | Arthur et al. . |
| 5,353,744 | 10/1994 | Custer . |
| 5,425,330 | 6/1995 | Touchton et al. . |
| 5,435,271 | 7/1995 | Touchton et al. . |

OTHER PUBLICATIONS

*Medical and Biological Engineering,* Walter S. Friauf, An Aversive Stimulator for Autistic Children, Sep., 1973, pp. 609–612.

*Retriever Field Trial News,* Aug./Sep., 1986, Momentum Technology Advertisement, p. 17.

*Hunting Retriever,* Oct./Nov. 1986, Momentum Technology Advertisement, p. 8.

*Primary Examiner*—John G. Weiss
*Assistant Examiner*—John M. Black
*Attorney, Agent, or Firm*—Barnes & Thornburg

[57] ABSTRACT

An animal training system has a stimulation unit for administering an electrical stimulation to an animal, a receiver for receiving a control signal, and a controller for processing the control signal and activating the stimulation unit for a predetermined duration. The electrical stimulation administered to the animal has a first magnitude at a first time in the stimulation duration, and a second greater magnitude at a second time in the duration. The system further includes a transmitter for transmitting the stimulation control signal, with the duration of the stimulation duration being selectable at the transmitter. The electrical stimulation signal preferably comprises a number of electrical pulses.

11 Claims, 5 Drawing Sheets

10
11
12
14
16
17

STIMULATION DEVICE AND TECHNIQUE

CROSS REFERENCE TO RELATED APPLICATIONS

The present application is related to the following U.S. applications: U.S. application Ser. No. 08/774,605 entitled "Network Switch with Multiple Bus Architecture" by Walker et al (Attorney Docket No. P-1108); U.S. application Ser. No. 08/774,557 entitled "Network Switch with Shared Memory System" by Mayer et al (Attorney Docket No. P-1109); U.S. application Ser. No. 08/774,601 entitled "A Programmable Arbitration System for Determining Priority of the Ports of a Network Switch" by Kotzur et al (Attorney Docket No. P-1110); U.S. application Ser. No. 08/774,555 entitled "Network Switch with Separate Cut-through Buffer" by Kotzur et al (Attorney Docket No. P-1112); U.S. application Ser. No. 08/774,553 entitled "Network Switch with Statistics Read Accesses" by Hareski et al (Attorney Docket No. P-1113); U.S. application Ser. No. 08/774,524 entitled "Network Switch with Dynamic Backpressure Per Port" by Witkowski et al (Attorney Docket No. P-1114); U.S. application Ser. No. 08/777,501 entitled "A Network Switch With a Multiple Bus Structure and a Bridge Interface for Transferring Network Data Between Different Buses" by Witkowski et al (Attorney Docket No. P-1115); and U.S. application Ser. No. 08/774,547 entitled "Method and System for Performing Concurrent Read and Write Cycles in a Network Switch" by Walker et al (Attorney Docket No. P-1117), all of which have at least one common inventor, are commonly assigned and are filed concurrently with the present application.

FIELD OF THE INVENTION

The present invention relates to the field of networking devices, and more particularly to a multiport polling system for a network switch.

BACKGROUND AND SUMMARY OF THE INVENTION

The present invention relates to an animal training device and a method of training an animal. The device and method respectively generate and utilize a correction stimulus that changes in magnitude over a duration of the correction stimulus.

Animal training devices are known. These devices are designed to administer a correction stimulus to an animal failing to conform to desired behavior. The desired behavior may include such things as performing certain activities upon command or cue, or remaining within a predetermined boundary area, such as a backyard. The desired behavior may alternatively or additionally include not barking or engaging in such activities as digging, jumping or chewing.

The correction stimulus should be administered to the animal only for as long as necessary to obtain the desired result. Administration of additional correction stimulation to the animal may result in over-stimulation. Such over-stimulation may cause animal confusion and failure to conform to desired behavior.

Preferably, the intensity of the correction stimulus should be quickly variable to respond to animal behavior. For example, if an animal is unresponsive to one level of correction stimulus, administration of a higher level of correction stimulus may be necessary to control the animal and have it conform to the desired behavior. If selection and administration of the higher level of correction stimulus takes too long, training of the animal may be difficult or impossible because the animal is unable to discern the meaning of the higher correction stimulation due to too long a lapse of time between the previous correction stimulation and the new correction stimulation.

The present invention relates to an animal training device and method of training an animal in accordance with the above-goals. A method of training an animal in accordance with the present invention includes the step of generating one of a plurality of correction stimuli. Each correction stimulus has a duration that extends between a first time and a second time. Each correction stimulus also has a first magnitude at the first time and a second magnitude at the second time. The method additionally includes the step of administering the selected correction stimulus to an animal failing to conform to desired behavior. The method further includes the step of removing the correction stimulus from the animal upon conformance with the desired behavior.

The magnitude of the stimulus at the first time is less than the magnitude of the stimulus at the second time, and the first time precedes the second. That is, each correction stimulus changes in a ramp-like manner. The stimulation may include a fixed number of electrical pulses. The fixed number of electrical pulses may be divided into a plurality of groups of electrical pulses having a substantially equal magnitude. There may be eight groups and the fixed number of electrical pulses in each group may be a multiple of eight. The duration may be a multiple of approximately 16 milliseconds and the fixed number of electrical pulses may be a multiple of eight. Alternatively, the electrical stimulation may include a substantially continuous waveform.

The administering step may include transmission of a stimulation control signal and receipt of the stimulation control signal by a stimulation unit that administers the correction stimulus based upon the received stimulation control signal. The removing step may include ceasing transmission of the stimulation control signal.

The method may further include the step of selecting one of a plurality of stimulation modes. Each stimulation mode controls a time length of the duration.

An embodiment of an apparatus for training an animal in accordance with the present invention may include a stimulation unit for administering a correction stimulus to an animal failing to conform to desired behavior. The apparatus also includes a receiver for receiving a stimulation control signal. The apparatus further includes a controller for processing the stimulation control signal and activating the stimulation unit to administer the correction stimulus to the animal. The correction stimulus has a duration that extends between a first time and a second time. The correction stimulus also has a first magnitude at the first time and a second magnitude at the second time.

The apparatus may additionally include a transmitter for transmitting the stimulation control signal in response to actuation of at least one control of the transmitter. The duration of the correction stimulus may be selectable at the transmitter.

The stimulation control signal may be generated by action of the animal where, for example, the apparatus is a bark inhibitor that detects barking by the animal and administers a correction stimulus to encourage the animal to cease barking.

The first magnitude of the correction stimulus is less than the second magnitude of the correction stimulus. That is, the correction stimulus changes in a ramp-like manner, with the first time occurring before the second time.

The correction stimulus is an electrical stimulation applied to the animal. The electrical stimulation may include a fixed number of electrical pulses. The fixed number of electrical pulses may be divided into a plurality of groups of electrical pulses having a substantially equal magnitude. There may be eight groups of electrical pulses and the fixed number of electrical pulses in each group may be a multiple of eight. Alternatively, the electrical stimulation may include a substantially continuous waveform.

The controller may deactivate the stimulation unit after a predetermined time interval of continuous animal stimulation even though the stimulation control signal is still being received to help prevent over-stimulation of the animal.

The controller may include either a microprocessor or a microcontroller.

Another embodiment of an apparatus for training an animal in accordance with the present invention includes structure for receiving a stimulation control signal. The apparatus also includes structure for administering a correction stimulus of changing magnitude to an animal failing to conform to desired behavior in response to the received stimulation control signal. The apparatus further includes structure for selecting the duration of the correction stimulus.

The administering structure may include a controller and a stimulation unit. The controller may include either a microprocessor or a microcontroller.

The stimulation control signal may be generated by action of the animal where, for example, the apparatus is a bark inhibitor that detects barking by the animal and administers a correction stimulus to encourage the animal to cease barking.

The apparatus may additionally include structure for transmitting the stimulation control signal.

The correction stimulus is an electrical stimulation applied to the animal. The electrical stimulation may include either a substantially continuous waveform or a fixed number of electrical pulses that may have some or all of the characteristics of the electrical pulses of the other above-described apparatus.

The magnitude of the correction stimulus may change by increasing over the duration.

The present invention may find use in a variety of applications including animal confinement systems, animal training systems, and bark inhibitors. The present invention allows for precise application and termination of correction stimuli to an animal to facilitate training and help prevent over-stimulation of the animal. Additionally, the present invention allows for increasing the magnitude of a correction stimulus administered to the animal quickly so that the benefit of a previous correction stimulus is not lost.

DETAILED DESCRIPTION OF THE DRAWINGS

Figure 1:
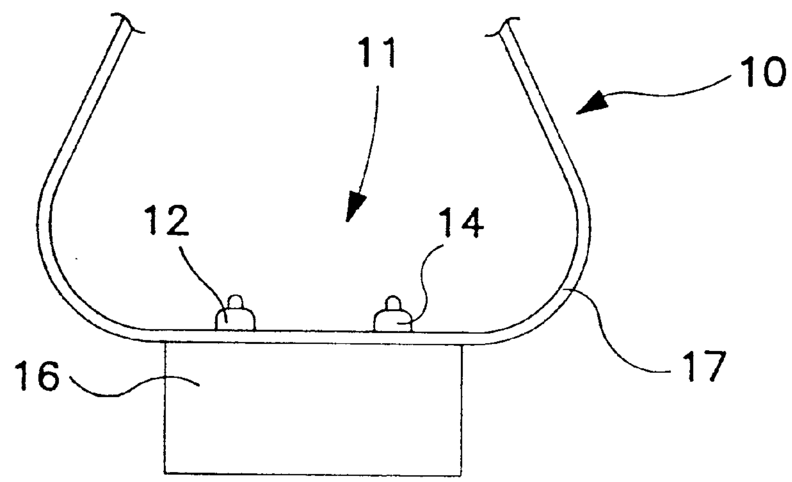
FIG. 1 is a front elevational view of a stimulation unit for administering one or more correction stimuli to an animal in accordance with the present invention.

A stimulation unit 11 of an apparatus 10 for training an animal in accordance with the present invention is shown in FIG. 1. Stimulation unit 11 administers one or more correction stimuli to an animal failing to conform to desired behavior. Each correction stimulus is administered as an electrical stimulation across a pair of probes 12 and 14. Stimulation unit 11 also includes a receiver (not shown) disposed within housing 16 for receiving one or more stimulation control signals. Stimulation unit 11 also includes a controller (not shown) disposed within housing 16 for processing each received stimulation control signal and activating stimulation unit 11 to administer a correction stimulus for a predetermined duration to the animal based upon the received stimulation control signal. The controller may include devices such as a microprocessor or a microcontroller. A collar 17 is used to fit stimulation unit 11 of training apparatus 10 to an animal.

As discussed above, probes 12 and 14 administer an electrical stimulation to the animal as the correction stimulus. It is to be understood however, that other embodiments of training apparatus 10 of the present invention may administer other forms of correction stimuli to the animal.

Figure 2:
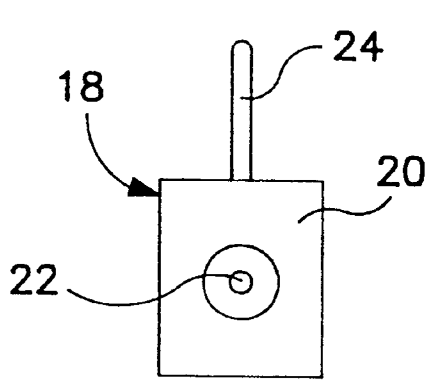
FIG. 2 is a front elevational view of a remote control unit for transmitting one or more stimulation control signals to the stimulation unit of FIG. 1.

A remote control unit 18 for transmitting the one or more stimulation control signals to the receiver of training apparatus 10 is shown in FIG. 2. Remote control unit 18 includes a housing 20 in which a transmitter (not shown) is disposed. The transmitter transmits the one or more stimulation control signals to the receiver via antennae 24 upon actuation of button 22.

Figure 3:
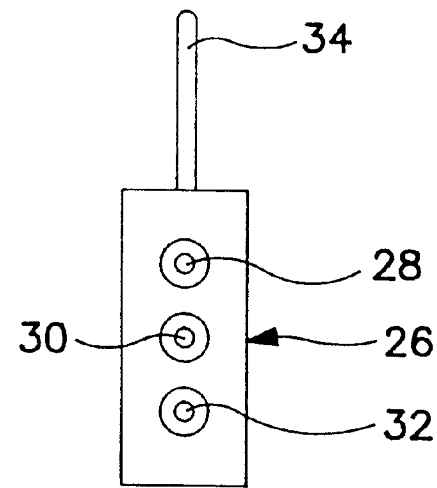
FIG. 3 is front elevational view of an alternative embodiment of a remote control unit for transmitting one or more stimulation control signals to the stimulation unit of FIG. 1.

An alternative embodiment of a remote control unit 26 for transmitting one of a plurality of stimulation control signals to the receiver of training apparatus 10 is shown in FIG. 3. Remote control unit 26 transmits one of a selected plurality of stimulation control signals to the receiver of animal training apparatus 10 via antennae 34 and actuation of one of buttons 28, 30, and 32. Remote control unit 26 is configured so that the duration of the correction stimulus administered to the animal is controllable upon actuation of one of buttons 28, 30, or 32 and transmission of the stimulation control signal. For example, remote control unit 26 may be configured so that actuation of button 28 produces a correction stimulus having a duration of one second, actuation of button 30 produces a correction stimulus of two seconds, and actuation of button 32 produces a correction stimulus of four seconds.

Figure 4:
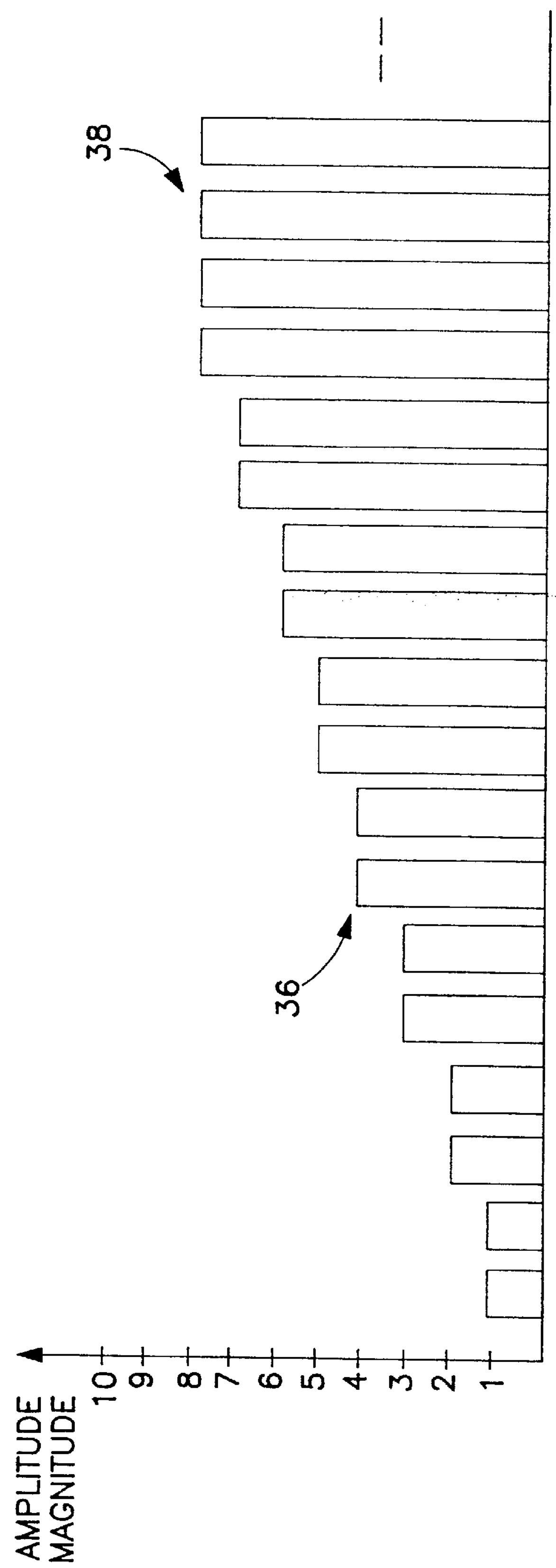
FIG. 4 is a graph of a correction stimulus in accordance with the present invention that may be administered to an animal failing to conform to desired behavior.

An example of a correction stimulus 36 in accordance with the present invention is shown in FIG. 4. As can be seen in FIG. 4, each pulse has an amplitude magnitude represented by the height of the pulse and a duration or period represented by the width of the pulse. In FIG. 4, each pulse may represent eight smaller pulses having the same magnitude as the larger pulse. These smaller pulses may have a duration substantially equal to 16 milliseconds. It is to be understood, however, that the present invention is not limited to pulses having such characteristics. As can also be seen in FIG. 4, the amplitude magnitude of the pulses of correction stimulus 36 increases over time from a minimum value (amplitude magnitude one) to a maximum value (amplitude magnitude eight). After application of the highest value pulses in stimulus 36, the pulses "plateau" at the highest level, as shown generally at 38, until the stimulation control signal is removed. Although not shown, it is to be understood that the pulses may change more or less than one magnitude level and the values shown are exemplary only, being different as the particular application requires. In addition, it is to be understood that the amplitude magnitude shown represents an absolute value, meaning that the pulses may have either actual positive or negative amplitude values. Further, although pairs of electrical pulses having identical amplitude magnitudes are shown in FIG. 4, it is to be understood that only one pulse at each magnitude may be used, or groups of more than two pulses may be used, as shown in FIG. 5 where groups of four pulses at each amplitude magnitude level are applied.

As can be seen in FIG. 4, correction stimulus 36 changes in magnitude (i.e., increases) over its duration. Thus, if the animal is unresponsive to lower amounts of stimulation, such as those having amplitude magnitude one, successively higher amounts of stimulation are administered encouraging the animal to conform to desired behavior. Over-stimulation of the animal is prevented by a time-out feature of training apparatus 10 that prevents application of further correction stimuli to the animal after a predetermined time interval, for example, eight seconds of continuous application of correction stimuli.

Figure 5:
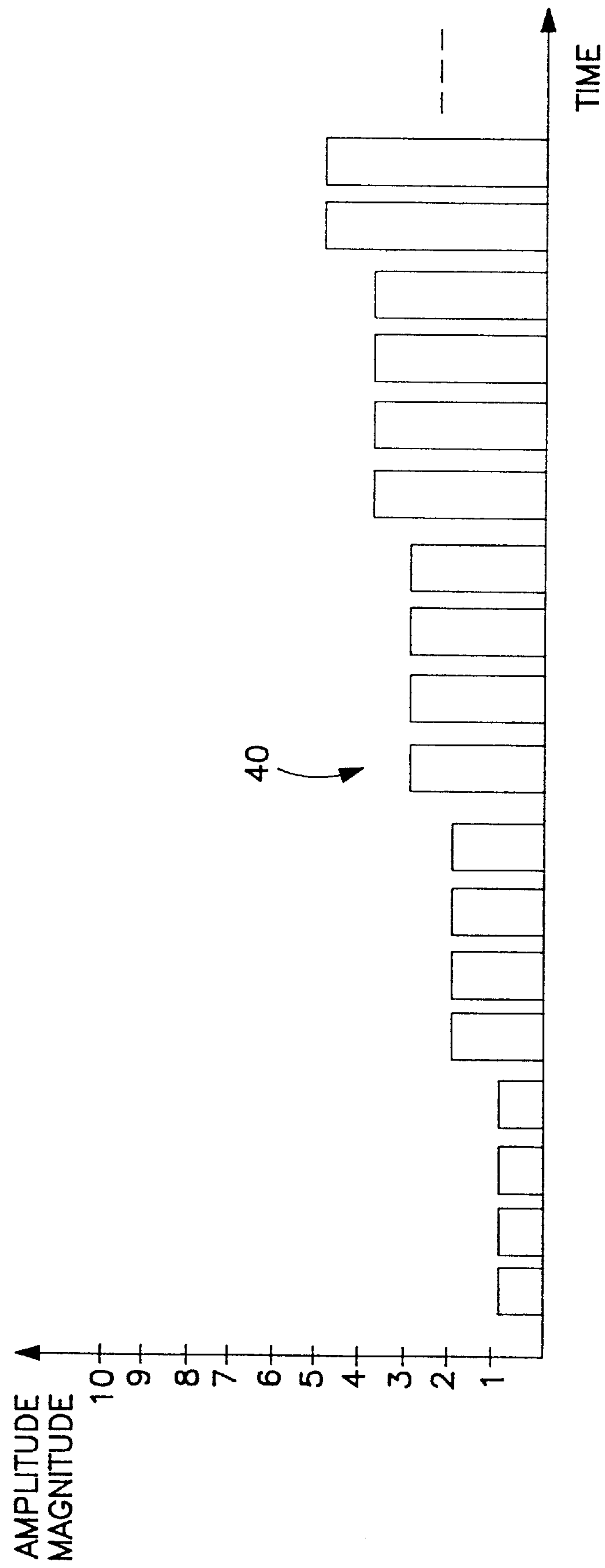
FIG. 5 is a graph of another correction stimulus in accordance with the present invention that may be administered to an animal failing to conform to desired behavior.

A graph of a correction stimulus 40 in accordance with the present invention that may be generated by training apparatus 10 is shown in FIG. 5. The pulses of correction stimulus 40 may also each represent groups of eight pulses of the same amplitude magnitude and smaller duration or period. Each smaller pulse may have a duration substantially equal to 16 milliseconds, as discussed above in connection with the smaller pulses of correction stimuli 36 and 38. As can be seen in FIG. 5, correction stimulus 40 has a duration twice that of correction stimulus 36 because groups of four pulses at each amplitude magnitude level are administered to the animal rather than two as shown in FIG. 4. Correction stimulus 40 thus supplies a lower level of correction stimulus to the animal over time as an alternative means of training the animal. Although not shown, it is to be understood that correction stimulus 40 includes two more pulses of amplitude magnitude five and four pulses at each of amplitude magnitude levels six, seven and eight. Also, the pulses of correction stimulus 40 and other like correction stimuli may have the other characteristics of the pulses of correction stimulus 36 described above. Training apparatus 10 may also be configured to time-out after a predetermined time interval when administering correction stimuli like that of correction stimulus 40 to help prevent over-stimulation of the animal. Training apparatus 10 may also be configured to administer other numbers of pulses of changing amplitude magnitude over a given duration.

Training apparatus 10 of the present invention allows for rapid removal of correction stimulus from the animal once the animal conforms to desired behavior. That is, correction stimuli 36, 38, 40, and others in accordance with the present invention may be terminated once the animal conforms to the desired behavior and the stimulation control signal is no longer received. For example, if the animal conforms to the desired behavior after the fourth pulse at amplitude magnitude level two of correction stimulus 40 is administered, further pulses at amplitude magnitude level 3 and above would not be administered to the animal if stimulation control signals are no longer transmitted. This helps prevent over-stimulation of the animal.

Training apparatus 10 of the present invention is designed to administer each magnitude level of a correction stimulus without interruption unless a user intentionally terminates application of the correction stimulus or training apparatus 10 times-out to help prevent over-stimulation of the animal, as described above. Thus, if a correction stimulus has begun and is at a particular magnitude level when the stimulation control signal is cut-off, as, for example, by noise interference, training apparatus 10 waits a predetermined period of time for receipt of the stimulation control signal and continuation of correction stimulus through any succeeding amplitude magnitude levels before resetting to the first amplitude magnitude level. For example, if correction stimulus 36 has begun and is at amplitude magnitude level three when the stimulation control signal is temporarily lost, for example, because of noise, when and if that particular stimulation control signal is again received before expiration of the predetermined time period, correction stimulus 36 will continue and increase through remaining amplitude magnitude levels rather than automatically resetting and beginning again at lowest amplitude magnitude level one.

Figure 6:
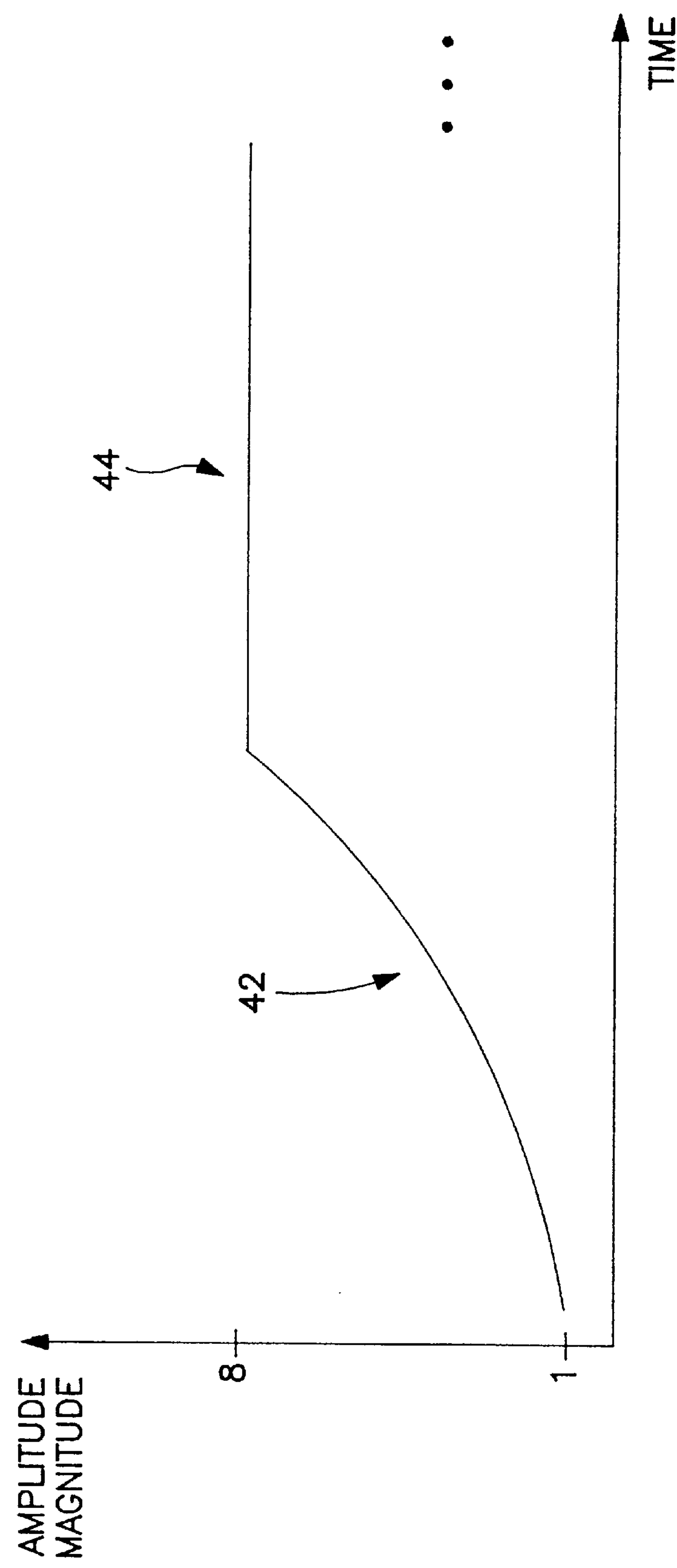
FIG. 6 is a graph of another correction stimulus in accordance with the present invention that may be administered to an animal failing to conform to desired behavior.

A continuous or substantially continuous correction stimulus 42 in accordance with the present invention is represented in FIG. 6. As can be seen in FIG. 6, correction stimulus 42 is a continuous waveform that increases in magnitude over its duration. Correction stimulus 42 may be administered to the animal when failing to conform to desired behavior. If the animal continues to fail to conform to desired behavior, the stimulus signal "plateaus" at the highest level, as shown at 44 in FIG. 6, until the animal complies. As with the waveforms shown in FIGS. 4 and 5, the waveforms of FIG. 6 may be terminated at any point during their application when the animal engages in the desired activity or a user of apparatus 10 terminates them. Also, waveforms 42 and 44 are timed-out after a predetermined time interval to help prevent over-stimulation of the animal. Further, if the stimulation control signal is temporarily lost and then regained, waveform 42 will continue through remaining higher amplitude magnitude levels, rather than resetting at the lowest level, as discussed above in connection with the pulse correction stimuli shown in FIGS. 4 and 5.

Figure 7:
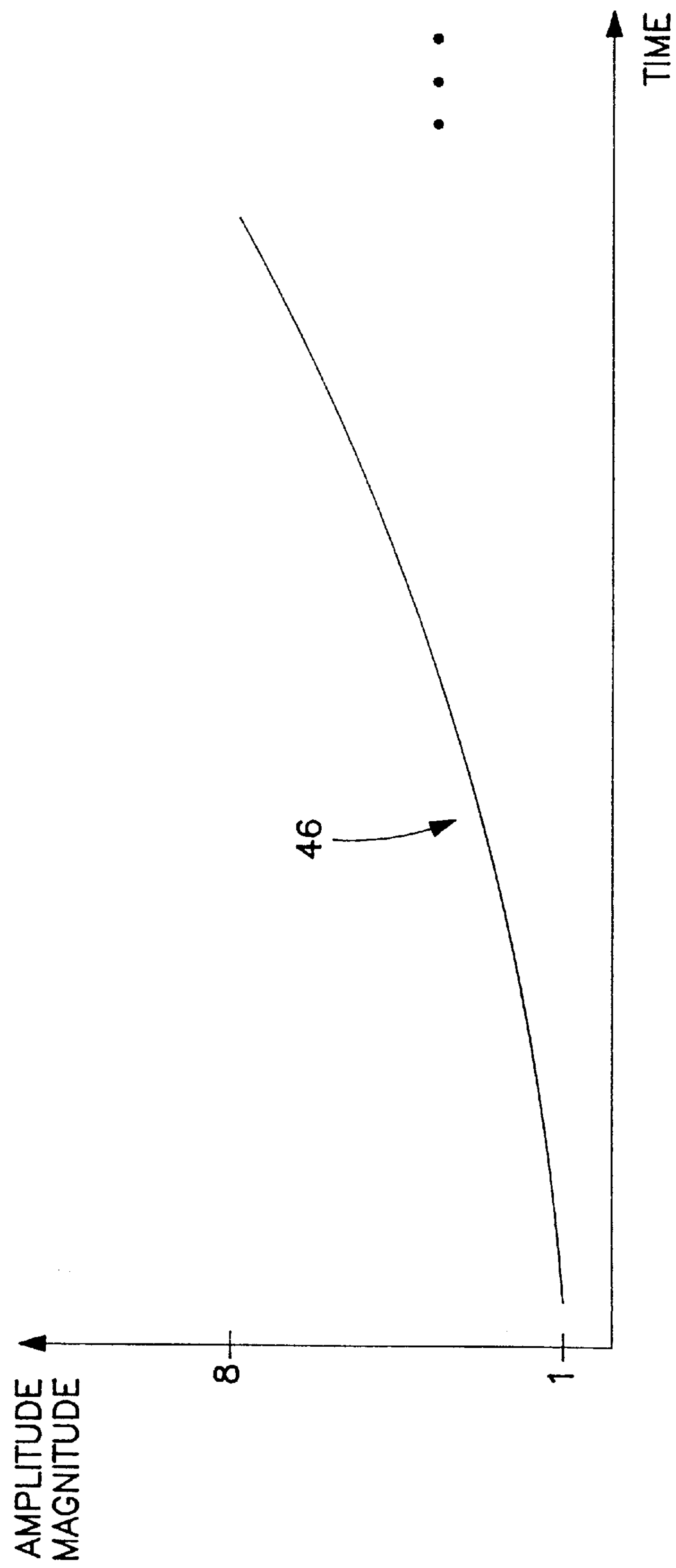
FIG. 7 is a graph of another correction stimulus in accordance with the present invention that may be administered to an animal failing to conform to desired behavior.

A continuous or substantially continuous correction stimulus 46 in accordance with the present invention is represented in FIG. 7. As can be seen in FIG. 7, correction stimulus 46 increases in magnitude from an amplitude magnitude of one to an amplitude magnitude of eight over a predetermined duration that is approximately twice that of correction stimulus 42 shown in FIG. 6. The dashed line to the far right of FIGS. 6 and 7 are intended to show that the correction stimulus is administered as long as a stimulation control signal is present and animal training apparatus 10 has not timed-out, as discussed above. It is to be understood that the amplitude magnitude levels shown in FIGS. 6 and 7 are exemplary only. Other levels and differences between maximum and minimum amplitude magnitude values are within the scope of the invention. Also, longer and shorter correction stimulation durations are within the scope of the present invention.

From the preceding description of the preferred embodiments, it is evident that the goals of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A training system for training an animal, comprising:

a stimulation unit for administering an electrical stimulation to an animal failing to conform to desired behavior;

a receiver for receiving a stimulation control signal; and a controller for processing the stimulation control signal and activating the stimulation unit to administer the electrical stimulation to the animal for a predetermined duration extending between a first time and a second time, the electrical stimulation having a first magnitude at the first time and a second greater magnitude at the second time.

2. The system of claim 1, further comprising a transmitter for transmitting the stimulation control signal in response to actuation of at least one control of the transmitter.

3. The system of claim 2, wherein the duration of the electrical stimulation is selectable at the transmitter.

4. The system of claim 1, wherein the stimulation control signal is generated by action of the animal.

5. The system of claim 1, wherein the electrical stimulation includes a fixed number of electrical pulses.

6. The system of claim 5, wherein the fixed number of electrical pulses comprises a plurality of groups of electrical pulses, the electrical pulses within each group being substantially equal in magnitude, the electrical pulses of at least one group having a different magnitude from the electrical pulses of another group.

7. The system of claim 6, wherein the plurality of groups include eight groups, and the fixed number of electrical pulses in each group is a multiple of eight.

8. The system of claim 1, wherein the electrical stimulation includes a substantially continuous waveform.

9. The system of claim 1, wherein the controller deactivates the stimulation unit after a predetermined time interval of continuous animal stimulation even though the stimulation control signal is still being received.

10. The system of claim 1, wherein the controller is a device selected from the group consisting of a microprocessor and a microcontroller.

11. A training system for training an animal, comprising:

a stimulation unit for administering a plurality of grouped electrical pulses to an animal failing to conform to desired behavior, the plurality of grouped electrical pulses including a first group having electrical pulses of a first magnitude and a second group having electrical pulses of a second, greater magnitude relative to the first magnitude;

a receiver for receiving a stimulation control signal; and a controller for processing the stimulation control signal and activating the stimulation unit to administer the plurality of grouped electrical pulses.

* * * * *